United States Patent [19]

Shimada

[11] 4,302,295
[45] Nov. 24, 1981

[54] NUCLEAR FUEL ELEMENT

[75] Inventor: Masayuki Shimada, Tokyo, Japan

[73] Assignee: Tokyo Shibaura Denki Kabushiki Kaisha, Kawasaki, Japan

[21] Appl. No.: 115,883

[22] Filed: Jan. 28, 1980

[30] Foreign Application Priority Data

Jan. 31, 1979 [JP] Japan .................................. 54-9156

[51] Int. Cl.³ .............................................. G21C 3/10
[52] U.S. Cl. .................................... 376/450; 376/418
[58] Field of Search ........................ 176/80, 81, 82, 68

[56] References Cited

U.S. PATENT DOCUMENTS 4,200,492 4/1980 Armijo .................................. 176/82

FOREIGN PATENT DOCUMENTS 5322635 5/1974 Japan .................................. 176/80
53-21478 1/1977 Japan .................................. 176/80

OTHER PUBLICATIONS

Strand et al., Nuclear Technology, vol. 26, Aug. 1975, pp. 472–479.

Primary Examiner—Donald P. Walsh
Attorney, Agent, or Firm—Oblon, Fisher, Spivak, McClelland & Maier

[57] ABSTRACT

A fuel element contains a tag gas serving to detect breakage of a cladding tube. Pellets of a fuel material and a metal foil having a tag gas implanted thereinto by ion implantation method are loaded in a cladding tube.

6 Claims, 3 Drawing Figures

NUCLEAR FUEL ELEMENT

BACKGROUND OF THE INVENTION

1. Field of the Invention:

This invention relates to a nuclear fuel element having a tag gas sealed therein for minimizing the accident such as breakage of a cladding tube.

2. Description of the Prior Art:

A number of fuel assemblies are arranged in a nuclear reactor. The fuel assembly used in a BWR consists of a number of fuel elements (rods) arranged in a lattice form within a channel. In a first breeder reactor, the fuel assembly consists of a number of fuel elements (pins) arranged in a honeycomb form within a wrapper tube. The fuel element is prepared by loading in a laminate form a number of pellets within a cladding tube and has plenum in the upper portion. The pellet is prepared by compression molding, followed by sintering, of a fuel material such as uranium dioxide. The fuel element thus prepared is subjected to fission reaction within a reactor and the tremendous heat generated by the fission reaction is taken out by a coolant.

When the cladding tube has been broken undesirably during the reactor operation, the fission product leaks within the reactor, resulting in contamination in and around the reactor as well as in trouble in the reactor operation. In order to detect breakage of the cladding tube in an early stage for preventing a serious accident, it is customary to seal a tag gas of particular composition within a cladding tube. If the cladding tube within the reactor has been broken, the leaked tag gas is detected, rendering it possible to know from the composition of the leaked tag gas which of the cladding tubes has been broken. Such a method of detecting an accident is called a gas tagging and the fuel element used is called a tag gas-sealed fuel element.

A conventional tag gas-sealed fuel element is of the type that a particular capsule having a tag gas-sealed therein is loaded in a cladding tube. The tag gas is released by some means from within the capsule into the cladding tube. For example, a conventional element is disclosed by C. A. Strand and R. E. Schenter in "Nuclear Technology", Vol. 26, pp. 472-479, August 1979. In this case, a tag gas-sealed stainless steel capsule having a thin film portion is loaded in the plenum of a cladding tube and a fuel element is assembled by sealing the both ends of the cladding tube. The thin film portion of the capsule is broken by a magnetically moving penetrator so as to release the tag gas within the cladding tube. Also known is a method in which the thin film portion of the capsule is broken by a penetrator which is moved by thermal expansion in accordance with temperature elevation of the reactor. Japanese Patent Publication No. 22635/78 discloses an additional technique. In this case, a capsule containing a tag gas is sealed by an alloy having a melting point lower than the operation temperature of the reactor so as to permit the alloy to be melted during the reactor operation for releasing the tag gas within the cladding tube. In general, the tag gas leaked within the reactor vessel by breakage of the cladding tube is detected by a mass spectrometer as shown in FIG. 1 of "Nuclear Technology", Vol. 26, p. 473 mentioned above.

The conventional tag gas-sealed fuel element described above leaves room for further improvements. Specifically, where tag gas-sealed capsule having a thin film portion is loaded in a cladding tube, the fuel element must be assembled very carefully so as not to break the thin film portion, leading to a very inefficient assembly work. Further, the assembled fuel element must be handled very carefully for preventing the thin film from being broken undesirably. Still further, it is extremely difficult and troublesome to seal a tag gas-containing capsule with a thin film. The technique utilizing a penetrator which is moved by thermal expansion for breaking the thin film gives rise to difficulty in achieving construction of the assembly which permits imparting the penetrator with a sufficient force for breaking the thin film, resulting in a low reliability. The technique utilizing a sealing alloy having a low melting point is also unsatisfactory in reliability. Specifically, the sealing alloy tends to peel off or drop because of the impulse or vibration in the constructing step of the fuel element unless the alloy is firmly bonded to the capsule. Further, when it is required to release the tag gas within the cladding tube before operation of the nuclear reactor, many portions of the fuel element must be heated from outside, resulting in that bad influences are given to the fuel element material. In addition, the alloy having a low melting point fails to be melted in some cases during operation of the nuclear reactor because of insufficient heat conduction.

SUMMARY OF THE INVENTION

An object of this invention is to provide a tag gas-sealed nuclear fuel element putting the impulse and vibration in the step of assembly and transportation of the fuel element out of the question and, thus, easy to be assembled and handled.

Another object is to provide a fuel element which permits carrying out a gas tagging by a very simple and reliable means without using gas tagging capsules.

According to this invention, there is provided a nuclear fuel element having a tag gas-implanted metal foil disposed within a cladding tube together with a fuel material. Isotopes of xenon, krypton, etc. used as the tag gas are implanted into the metal foil by ion implantation method. The metal foil is formed of a material which is not harmful to the nuclear reactor operation including, for example, aluminum or an alloy thereof, stainless steel and zirconium or an alloy thereof which is also used in some cases as an oxygen getter in a light water-type reactor.

This invention can be more fully understood from the following detailed description when taken in conjunction with the accompanying drawings, in which.

Figure 1:
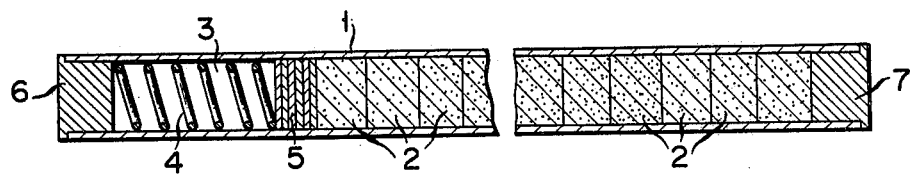
FIG. 1 is a schematic cross sectional view of a nuclear fuel element comprising a tag gas-implanted metal foil according to one embodiment of this invention.

FIG. 1 shows a nuclear fuel element according to one embodiment of this invention. It is seen that a plurality of pellets 2, prepared by molding uranium dioxide, followed by sintering, are loaded in a cladding tube 1. Loaded in plenum 3 of the cladding tube 1 are a metal foil 5 having a tag gas implanted thereinto by ion implantation method and a spring 4. Both open ends of the cladding tube 1 are sealed by stoppers 6 and 7. In general, the cladding tube 1 and the stoppers 6, 7 are formed of a zirconium alloy for a BWR and of stainless steel for a fast breeder reactor. The spring 4 serves to maintain the pellets 2 and the metal foil 5 at their proper locations. In the embodiment of FIG. 1, the metal foil 5 is disposed on the laminated pellets 2. But, the metal foil may be disposed beneath or between the pellets.

Figure 2:
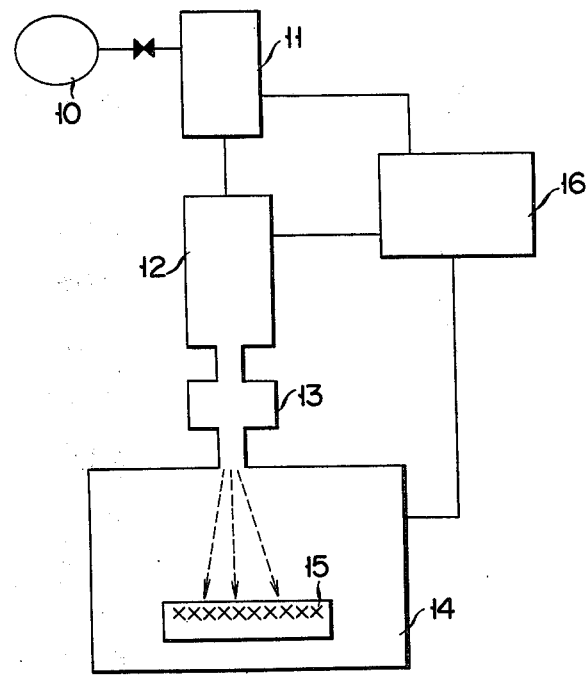
FIG. 2 is a block diagram of an apparatus for producing a tag gas-implanted metal foil used in this invention.

The tag gas-implanted metal foil can be prepared by employing a known ion implantation apparatus and method disclosed in, for example, U.S. Pat. No. 4,051,063 granted to R. S. Nelson et al. and U.S. Pat. No. 4,124,802 granted to M. Terasawa et al. FIG. 2 illustrates how Kr gas is implanted into an aluminum foil by using an apparatus disclosed in the latter U.S. patent. As shown in the drawing, Kr gas is sent from a gas reservoir 10 through a pressure control value into an ion source 11 so as to be ionized into $Kr^+$. The krypton ion ($Kr^+$) is accelerated by an accelerator 12 to have an energy of about 50 KeV and runs through a magnetic deflection device 13 so as to be implanted into a metal aluminum foil 15 disposed within an implantation chamber 14. It is seen that an evacuation means 16 is provided for evacuating the ion source 11, the accelerator 12 and the implantation chamber 14.

Figure 3:
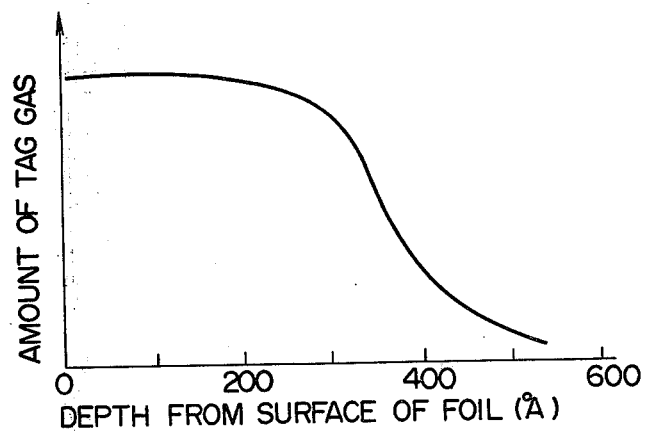
FIG. 3 is a graph showing the distribution of tag gas implanted into a metal foil.

When implanted into an aluminum foil, $Kr^+$ with 50 KeV of acceleration energy penetrates about 300 Å into the foil and is distributed as shown in FIG. 3. The maximum amount of tag gas which can be implanted into a metal foil, i.e., saturation amount, is determined by the acceleration energy imparted to the tag gas. Where a tag gas imparted with 50 KeV of acceleration energy is implanted into an aluminum foil, the saturation amount of the tag gas is about $1 \times 10^7$ Kr/cm$^2$.

The ionized tag gas implanted into a metal foil is retained within the metal foil in the form of individual atoms or aggregation of atoms forming bubbles and is thermally diffused and released from the foil to the outside when the foil has been heated. The release of tag gas is promoted in accordance with elevation of the heating temperature. But, all the tag gas implanted into the metal foil is not always released by the heating. For example, about 55% of Kr gas implanted into an aluminum foil is released at a temperature of 450° C. to which the plenum of a fuel element is exposed at the initial stage of a nuclear reactor operation, with about 45% of Kr gas retained within the aluminum foil. Naturally, the residual amount within a foil should be taken into account in determining the amount of tag gas which is to be implanted into the foil. In other words, the foil should be enabled to release a tag gas in an amount large enough to be detected. Where Kr ions accelerated to have an energy level of 500 KeV were implanted into a stainless steel foil in an amount of $2 \times 10^{15}$ Kr/cm$^2$, the implanted Kr begins to be released from the foil at 820° C. and substantially all the Kr atoms are released at 1,200° C.

In general, a tag gas is implanted into a metal foil in an amount about two times as much as that required for detection. The required area of a metal foil is determined by the saturation amount of tag gas determined by the acceleration energy imparted to the ionized tag gas. If a tag gas is implanted into both sides of a metal foil, it naturally suffices for one surface area of the foil to be half the required area.

A metal foil having a thickness greater than the penetration range of the ionized tag gas can perform its function. FIG. 3 shows that it suffices for a metal foil to be about 1,000 Å thick in view of its tag gas sealing function. However, it is practical in view of manufacturing process and mechanical strength to use a metal foil about 1 to 3 μm thick. Also, the shape of a metal foil need not be restricted as far as the foil can be loaded in a cladding tube. For example, a plurality of circular foils about 5.5 mm in diameter can be loaded in the form of a laminate or apart from each other within a cladding tube having an inner diameter of 5.6 mm. It is also possible to wind a ribbon-shaped foil into a coil of a diameter smaller than the inner diameter of a cladding tube for loading of the coil within the cladding tube. A tag gas can be implanted into a metal foil formed into a desired shape, or a tag gas-implanted metal foil can be formed into a desired shape. Where a tag gas is implanted into a stainless steel foil, the foil should desirably be disposed between fuel pellets because somewhat high temperature is required for releasing the implanted tag gas.

In general, isotopes of Kr and Xe are used in the form of a mixture or independently as a tag gas. It is possible to implant a mixed gas into a metal foil. It is also possible to implant the tag gas components individually and successively into a metal foil.

According to a preferred embodiment of this invention, each component of the tag gas is implanted separately into a single metal foil having a particular shape and a plurality of gas-implanted foils are loaded in combination within a cladding tube. In this embodiment, it is possible to make arrangement such that the kind of the tag gas component can be distinguished by the shape of the metal foil. This renders it possible to load a desired amount of a desired tag gas into a cladding tube efficiently. In addition, the mixing ratio of the components can be readily adjusted by counting the number of metal foils.

A tag gas of Kr was actually implanted by ion implantation method into a ribbon-shaped aluminum foil 3 μm in thickness, 2 cm in width and 650 cm in length. The volume of the foil was:

$$2 \text{ cm} \times 650 \text{ cm} \times 0.0003 \text{ cm} = 0.39 \text{ cm}^3.$$

The Kr gas was implanted at an acceleration energy of 50 KeV into both surface area of the foil, followed by winding the foil into a coil 5.0 mm in diameter and 2 cm in height. The coil was small enough to be loaded into a cladding tube of a fuel element. Suppose Kr was implanted into the foil at the amount of $4 \times 10^{16}$ Kr/cm$^2$, which is somewhat lower than the saturation amount under the acceleration energy of 50 KeV, i.e., $1 \times 10^{17}$ Kr/cm$^2$. In this case, the total amount of Kr implanted into the entire foil is about $1 \times 10^{20}$ Kr (the entire surface area of the foil is:

$$2 \text{ cm} \times 650 \text{ cm} \times 2 = 2,600 \text{ cm}^2).$$

As a matter of fact, about $5.5 \times 10^{19}$ Kr atoms were released from the foil when heated at 450° C. for 5 minutes. Incidentally, 2 cc of Kr gas at standard condition, which is sufficient for use as a tag gas, contains $5.4 \times 10^{19}$ Kr atoms. In other words, the amount of Kr atoms actually released from the foil in the above-described experiment is sufficient for use as a tag gas.

As described above in detail, a tag gas is sealed in a metal foil in this invention, resulting in that the sealed tag gas is not released unless the metal foil is heated. In other words, the sealed tag gas is not released by the impulse or vibration in the step of assembly or transportation of a fuel element, rendering it very easy to handle the fuel element. In addition, a conventional apparatus can be used for assembling a fuel element, a special apparatus need not be used. It should also be noted that metal foils of different shapes can be used for sealing different tag gas components separately, rendering it possible to distinguish the tag gas component by the shape of the metal foil. In this case, the tag gas components can be mixed at a desired ratio quite easily.

To reiterate, a tag gas implanted into a metal foil is released from the foil in accordance with elevation of the ambient temperature caused by start-up of a nuclear reactor operation. As a result, a cladding tube is filled with the tag gas in an amount large enough to be detected, rendering it possible to carry out gas tagging.

What is claimed is:

1. A fuel element comprising a cladding tube and a fuel pellet material loaded in the cladding tube, characterized in that a metal foil having a tag gas implanted therein for detecting breakage of the cladding tube is further loaded in the cladding tube, the metal foil being loaded in the cladding tube on the end portion or between said pellet in the form of circular foils or coil of a ribbon-shaped foil, and the circular foil or coil having a diameter smaller than the inner diameter of the cladding tube.

2. The fuel element according to claim 1, wherein said metal foil is formed of a metal selected from the group consisting of aluminum, an aluminum alloy, zirconium, a zirconium alloy and stainless steel.

3. The fuel element according to claim 1, wherein said tag gas is implanted into both surface regions of the metal foil.

4. The fuel element according to any one of claims 1 to 3, wherein said tag gas-implanted metal foil is loaded in a plenum of the cladding tube.

5. The fuel element according to any one of claims 1 to 3, wherein said tag gas-implanted metal foil is disposed between pellets of fuel material.

6. The fuel element according to any one of claims 1 to 3, wherein tag gas components are implanted individually into metal foils of different shapes such that the kind of the tag gas component can be distinguished by the shape of the metal foil and metal foils of different shapes are loaded in combination in the cladding tube in accordance with a desired composition of the tag gas.

* * * * *

Disclaimer 4,302,295.—*Masayuki Shimada,* Tokyo, Japan. NUCLEAR FUEL ELEMENT. Patent dated Nov. 24, 1981. Disclaimer filed Feb. 28, 1984, by the assignee, *Tokyo Shibaura Denki Kabushiki Kaisha.*

Hereby enters this disclaimer to claims 1–6 of said patent.

[*Official Gazette April 17, 1984.*]